United States Patent
Fan et al.

(10) Patent No.: US 12,304,066 B2
(45) Date of Patent: May 20, 2025

(54) AUTOMATIC GRIPPER FINGERTIP DESIGN TO REDUCE LEFTOVER IN RANDOM BIN PICKING APPLICATIONS

(71) Applicant: FANUC CORPORATION, Yamanashi (JP)

(72) Inventors: Yongxiang Fan, Palo Alto, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 226 days.

(21) Appl. No.: 18/067,110

(22) Filed: Dec. 16, 2022

(65) Prior Publication Data
US 2024/0198543 A1 Jun. 20, 2024

(51) Int. Cl.
*B25J 19/00* (2006.01)
*B25J 9/16* (2006.01)

(52) U.S. Cl.
CPC ........... *B25J 19/007* (2013.01); *B25J 9/1612* (2013.01); *B25J 9/163* (2013.01); *B25J 9/1671* (2013.01)

(58) Field of Classification Search
CPC ........ B25J 19/007; B25J 9/1612; B25J 9/163; B25J 9/1671; G06F 30/17; G06F 30/20; G06F 2113/10
USPC ....................................................... 700/245
See application file for complete search history.

(56) References Cited

U.S. PATENT DOCUMENTS

| | | | |
|---|---|---|---|
| 7,313,464 B1 * | 12/2007 | Perreault | B25J 9/1666 |
| | | | 700/262 |
| 2018/0127219 A1 * | 5/2018 | Wagner | G05B 19/4189 |
| 2019/0033067 A1 * | 1/2019 | Yamagami | G01B 11/2513 |
| 2022/0072707 A1 * | 3/2022 | Fan | G06T 7/73 |

(Continued)

FOREIGN PATENT DOCUMENTS

| | | | | |
|---|---|---|---|---|
| CN | 110199231 B | * | 12/2023 | B65G 47/40 |
| JP | 2022187984 A | * | 12/2022 | B25J 9/16 |
| WO | WO-2018098460 A1 | * | 5/2018 | B65G 43/08 |

OTHER PUBLICATIONS

Wolniakowski, Adam, et al. "Task and context sensitive optimization of gripper design using dynamic grasp simulation." 2015 20th International Conference on Methods and Models in Automation and Robotics (MMAR). IEEE, 2015.

*Primary Examiner* — B M M Hannan
(74) *Attorney, Agent, or Firm* — John A. Miller; Shumaker, Loop & Kendrick, LLP (57) ABSTRACT

An automated technique for robot gripper fingertip design. A workpiece design and a bin shape are provided as inputs, along with a parameterized gripper design. The gripper parameters define the lengths of segments of the fingertips, and the bend angle between fingertip segments. A fingertip shape, defined by selecting parameter values, is used in a simulated picking of parts from many different randomly defined piles of workpieces in the bin. Grasps for the simulated bin picking are pre-defined and provided as input. A score is assigned to the particular fingertip shape based on the average number of leftovers from the many simulated bin picking operations. A new fingertip shape is then defined by selecting new values for the parameters, and the simulations are repeated to assign a score for the new fingertip shape. This process is repeated to suitably sample the parameter range, and a best-performing fingertip shape is identified.

20 Claims, 10 Drawing Sheets

Part I: Parameterize Gripper (56) References Cited

U.S. PATENT DOCUMENTS

2022/0388162 A1\* 12/2022 Fan .......................... G06N 3/09
2022/0391638 A1\* 12/2022 Fan ........................ G06V 10/26

\* cited by examiner

Part I: Parameterize Gripper

AUTOMATIC GRIPPER FINGERTIP DESIGN TO REDUCE LEFTOVER IN RANDOM BIN PICKING APPLICATIONS

BACKGROUND

Field

The present disclosure relates generally to a method for robot gripper fingertip design and, more particularly, to an automated method for gripper fingertip design which selects a gripper fingertip shape which optimizes robot bin picking performance for a particular workpiece and bin, where a parameterized gripper shape is provided as input and the shape parameters are varied and used in simulation until a fingertip shape is identified which provides the best performance.

Discussion of the Related Art

The use of industrial robots to perform a wide range of manufacturing, assembly and material movement operations is well known. One such application is a pick and place operation, where a robot picks up individual parts from a bin and places each part at a prescribed location for further processing or packaging. In a typical pick and place operation, parts are dropped randomly into a bin, such as after a casting or injection molding process, and a bin containing many parts is then presented to a robotic station where the robot is tasked with picking the parts out of the bin one at a time. A camera or machine vision system is used to identify the position and orientation of individual parts in the bin, and a target grasp location on one of the parts is determined, where the robot then uses a gripper to grasp the target part, move the part and place it in a destination such as a shipping container or on a conveyor.

The parts or workpieces which are to be grasped could have almost any shape imaginable. Grasp generation techniques are known, where the workpiece shape is analyzed and preferred stable grasps on the part are computed in advance of the robotic picking operation. However, because of the complexities of workpiece shape, and the random nature of the jumble of workpieces in the bin, it is often impossible for the robot to pick every workpiece out of the bin. For example, a workpiece could be situated in a corner of the bin where the approach angle of the robotic gripper is limited to a small range, and the available approach angle does not correspond with a stable grasp based on the pose which is presented by the workpiece. Situations such as this often lead to a small number of workpieces being leftover in the bin, "unpickable" or unable to be grasped by the robot.

It is also generally known that the picking performance of a gripper, for a given workpiece design and bin, is dependent upon the shape of the gripper fingers. That is, for one particular workpiece design, long and slender gripper fingertips may produce the best bin picking performance (fewest leftover parts in the bin), and for another workpiece design, shorter fingertips with more curvature may produce the best results.

In the past, gripper fingertip shape has been determined based on simple availability, by expert user estimation, or by trial and error experimentation. These methods leave much to be desired, as they usually produce sub-optimal bin picking performance, suffer from long development lead times, or both.

Although some gripper finger shape optimization techniques have recently been developed, these techniques focus on details such as the shape of the convex inner gripper surfaces which best matches the shape of a workpiece exterior surface. These known gripper finger shape optimization techniques do not address bin picking performance—particularly the interference of the gripper with surrounding parts or bin walls, where these interferences are a major determining factor leading to leftover parts in real world bin picking operations.

In light of the circumstances described above, there is a need for an application-specific gripper fingertip design technique which quickly and easily optimizes gripper fingertip shape for a particular workpiece in order to minimize leftovers in bin picking.

SUMMARY

The present disclosure describes an automated technique for robot gripper fingertip design. A workpiece design and a bin shape are provided as inputs, along with a parameterized gripper design. The parameters in the gripper design define the lengths of segments of the fingertips, and the bend angle between each fingertip segment. A particular fingertip shape is defined by selecting values of the parameters, and the fingertip shape is used in a simulated picking of parts from many different randomly defined piles of workpieces in the bin. Grasps for the simulated bin picking are defined in advance and provided as input. A score is assigned to the particular fingertip shape based on the average number of leftovers from the many simulated bin picking operations. A new fingertip shape is then defined by selecting new values for the parameters, and the simulations are repeated in order to assign a score for the new fingertip shape. This process is repeated until the parameter range has been suitably sampled, and a best-performing fingertip shape is then identified.

Additional features of the presently disclosed methods will become apparent from the following description and appended claims, taken in conjunction with the accompanying drawings.

DETAILED DESCRIPTION OF THE EMBODIMENTS

The following discussion of the embodiments of the disclosure directed to a method for automatic robot gripper fingertip design is merely exemplary in nature, and is in no way intended to limit the disclosed techniques or their applications or uses.

The use of industrial robots for picking parts from a source and placing them at a destination is well known. In a typical pick and place operation, a supply of parts is provided in a bin, such as a bin containing a random pile of parts which have been cast or partially assembled, where the parts need to be picked up from their random poses in the bin and placed in a particular pose at a destination location. Machine tending is one type of robotic part picking and placement having unique requirements, while other bin picking and placement applications also typically require the part to be placed in a particular pose at the destination such as a conveyor or a shipping container.

Figure 1:
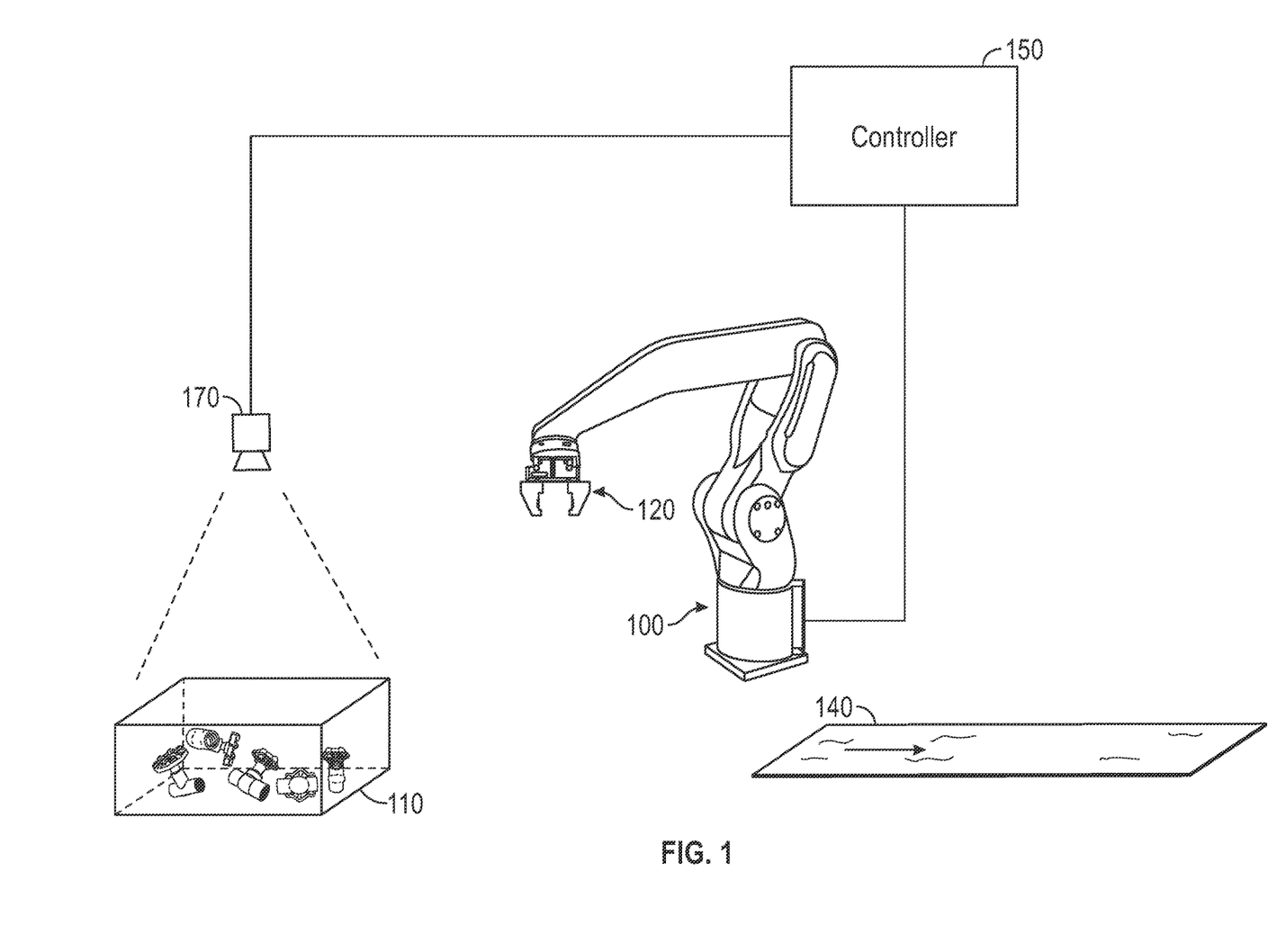
FIG. 1 is an illustration of a robotic part grasping system, where an industrial robot picks a workpiece from a bin and places the workpiece for further processing, according to an embodiment of the present disclosure.

FIG. 1 is an illustration of a robotic part grasping system, where an industrial robot picks a workpiece from a bin and places the workpiece for further processing, according to an embodiment of the present disclosure. In the system of FIG. 1, a variety of grasps on a part or workpiece are taught or computed in advance and provided in a database, and an industrial robot 100 then picks parts from a bin 110 using one of the grasps from the database and places the parts at a destination location for further processing.

In one application of the system of FIG. 1, the industrial robot 100 picks a part from the bin 110 and places the part on a conveyor 140 where it is carried away for further processing or packaging. The robot 100 has a gripper 120 with fingers which open and close to grasp a part. The gripper finger shape is the subject of the present disclosure and is discussed in detail below.

Motion of the robot 100 is controlled by a controller 150, which communicates with the robot 100 via a cable (shown) or wirelessly. The controller 150 provides joint motion commands to the robot 100 and receives joint position data from encoders in the joints of the robot 100, as known in the art. The controller 150 also provides commands to control operation of the gripper 120 (grip/ungrip commands and gripper opening width).

During real-time bin picking operations by the system of FIG. 1, the robot 100 must grasp a selected part from the bin 110—based on images of the bin 110 from a camera 170—such that the gripper 120 closes its fingers on the selected part according to a chosen stable grasp. Internal grasps are also possible, where the gripper 120 opens its fingers to contact inside surfaces of an aperture in the selected part. The grasp includes the position and orientation of the gripper 120 with respect to the selected part, along with a gripper finger width. In order to maximize bin picking productivity, it is known to pre-compute a grasp database containing many high-quality, stable grasps, and one of the grasps from the database is chosen for each part which is selected during real-time bin picking.

The camera 170 is typically a three-dimensional (3D) camera providing both color image data and pixel depth map data, but may be some other type of 3D sensor which provides data suitable for determining the pose (position and orientation) of parts in the bin 110. More than one of the cameras 170 may be used to provide more robust depth and image data which aids in part pose determination, and also allows for non-vertical gripper approach angles. When multiple cameras are used, the cameras 170 may be two-dimensional (2D) cameras.

In the system of FIG. 1, the controller 150 performs the part selection and grasp computation based on the images from the camera 170, and using the grasp database described above. Using the grasp data, the controller 150 computes robot motion instructions which will cause the gripper 120 to grasp a part and move the part to the conveyor 140. The controller 150 then provides the instructions to the robot 100 which picks and places the selected part. The controller 150 then receives new images of the bin 110 from the camera 170, selects another part based on a quality grasp, and so forth. This process continues until either the bin 110 is empty, or none of the parts remaining in the bin 110 present a suitable stable grasp. In the latter case, any remaining unpickable parts are "leftovers", which must be handled in some other manner.

In most applications, all of the parts in the bin 110 are of the same type. It is known in the art to select a particular type of the gripper 120 based on the design of the part being picked, and furthermore to select a particular design of the fingertips of the gripper 120 to attempt to optimize bin picking performance. However, in the past, gripper fingertip design has been done based on judgement or past experience of an expert operator, or using time-consuming experimental or empirical methods. A faster and more effective technique for gripper fingertip design is needed.

Figure 2A:
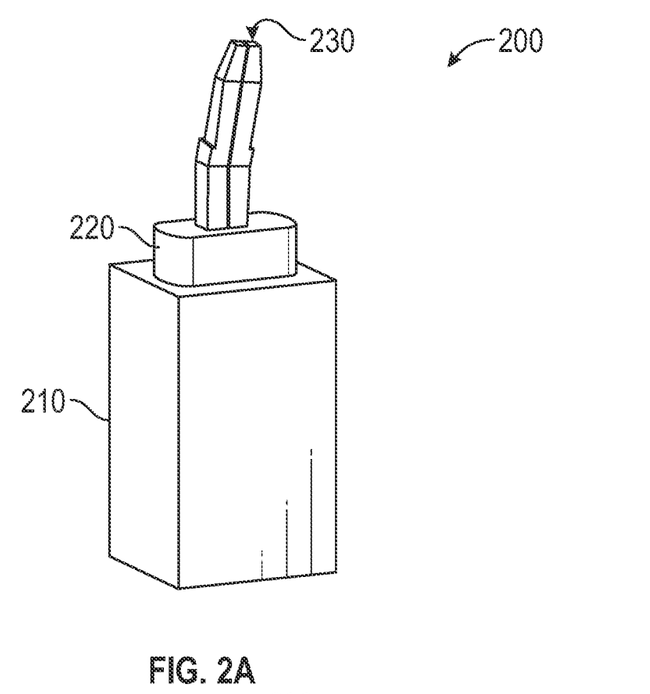
FIGS. 2A and 2B are illustrations of a parallel-finger gripper, in closed and open configurations, respectively, according to an embodiment of the present disclosure.
Figure 2B:
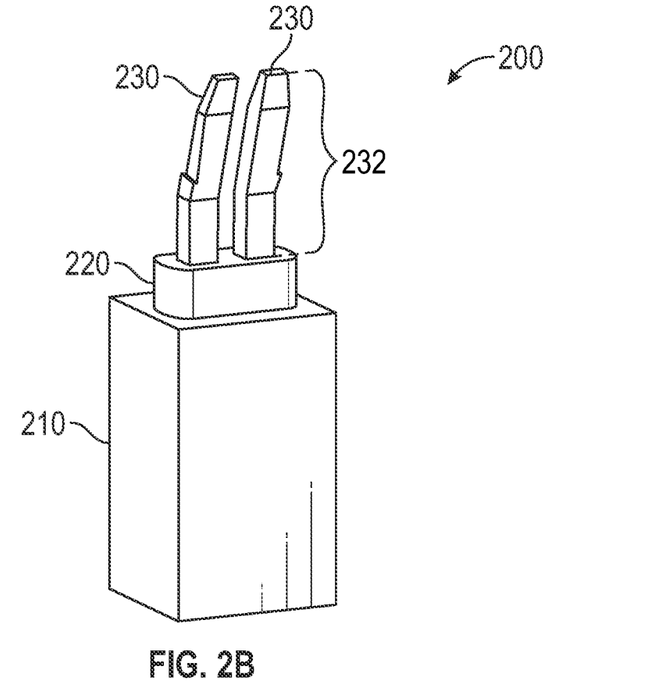

FIGS. 2A and 2B are illustrations of a parallel-finger gripper 200, in closed and open configurations, respectively, according to an embodiment of the present disclosure. The gripper 200 corresponds with the gripper 120 of FIG. 1. The gripper 200 includes a gripper body 210, and actuator 220 and gripper fingers 230. The gripper body serves as a connection interface to the outer arm or wrist of the robot 100, and contains structural elements and electrical elements (e.g., servo motor) required to enable actuation of the fingers 230 based on commands from the robot 100. In the example discussed here, the fingers 230 move in a parallel motion along the actuator 220, from a closed position where the fingers 230 touch each other (FIG. 2A) to an open position where some distance exists between the fingers 230 (FIG. 2B). In one gripper embodiment, the actuator 220 causes the opening and closing motion of the fingers 230 upon actuation of the servo motor.

The gripper 200 is merely illustrative of the basic design of a parallel-finger gripper, and the sizes of the components may vary from those shown in FIGS. 2A/2B. For example, the gripper body 210 may be wider and not as thick, and the actuator 220 may be longer/wider than shown in the figures, to allow a greater opening distance of the fingers 230.

An outer portion of the fingers 230 (outside of the actuator 220) is known as gripper fingertips 232. As shown most clearly in FIG. 2B, the fingertips 232 may be designed with certain shape characteristics—such as width and thickness, taper, a bend angle and segment lengths above and below the bend. Using the techniques of the present disclosure, these shape characteristics can be selected to optimize the effectiveness of bin picking (minimize the number of leftovers) for a particular design of the part being picked.

Figure 3:
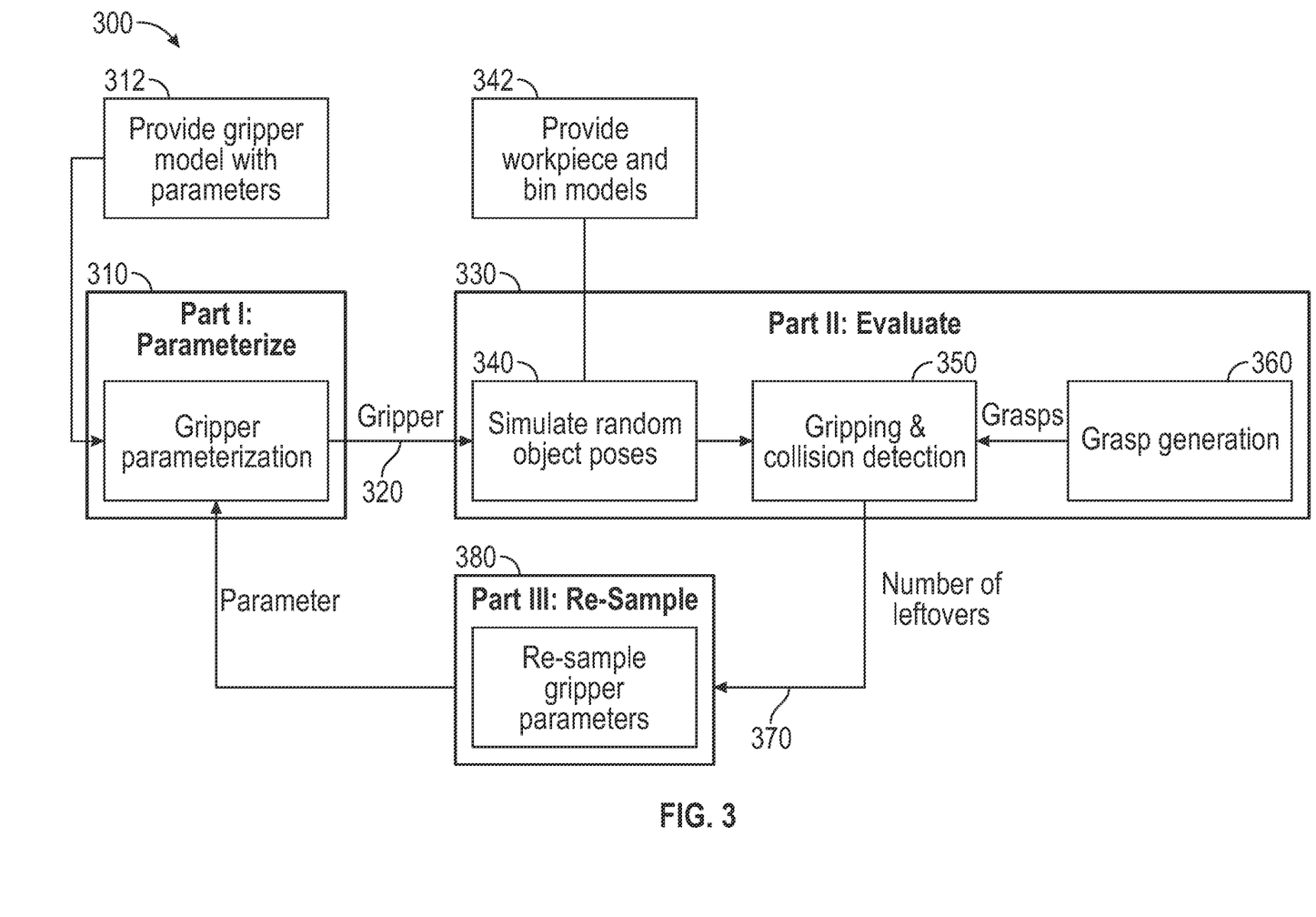
FIG. 3 is a flowchart diagram of a method for automatic gripper fingertip design, where gripper size and shape parameters are varied, each gripper design is evaluated for bin picking effectiveness, and a best performing gripper is identified, according to an embodiment of the present disclosure.

FIG. 3 is a flowchart diagram 300 of a method for automatic gripper fingertip design, where gripper size and shape parameters are varied, each gripper design is evaluated for bin picking effectiveness, and a best performing gripper is identified, according to an embodiment of the present disclosure. The method of the present disclosure, shown in FIG. 3, includes three main steps; Part I: Parameterize the gripper; Part II: Evaluate performance of the individual gripper design; and Part III: Re-Sample gripper parameters.

Part I: Parameterize the gripper is shown in box 310. A gripper model with fingertip size/shape parameters is provided at box 312. The overall gripper model provided at the box 312 includes all size, shape and orientation values necessary to define the geometry of the gripper and also define the position of the gripper fingers relative to the robot arm. For example, the gripper model includes the length, width and thickness of the gripper body 210, the sizes and shapes of the actuator 220 and the fingers 230. In other words, given a robot pose (position and orientation of the wrist joint), along with a gripper width value commanded by the robot controller, the gripper model enables the positions of the gripper fingers to be calculated in a coordinate frame such as a workcell coordinate frame in which the robot is operating. The robot can then be articulated so that the gripper fingers are moved to a grasp location on a part in the bin, as understood by those skilled in the art.

While most dimensions in the gripper model have fixed values, some size and shape features of the gripper fingers are defined as parameters which can be varied during fingertip shape optimization. Specific size and shape features which are parameterized in a preferred embodiment of the disclosed technique are discussed below with respect to FIG. 4.

At the box 310, specific values for the fingertip size/shape parameters are selected and applied in the model from the box 312, and a fully-specified gripper design is provided on line 320 to box 330 for Part II: Evaluate gripper performance. The gripper performance evaluation which is carried out at the box 330 includes bin picking simulations using the specified gripper design.

At box 340, a simulated bin containing a random pile of objects (i.e., parts, or workpieces) is provided using a known type of calculation. A shape model of the workpiece (e.g., a CAD solid model) is provided at box 342, as is a model of the bin (interior length, width and height). Using the workpiece and bin models, along with a defined number of workpieces to include in each bin, the bin containing many workpieces in random poses can be computed at the box 340. Illustrations of such bins containing workpieces are provided in later figures.

At box 350, a bin picking simulation is carried out using the simulated bin of objects provided from the box 340 and the specified gripper provided on the line 320. The bin picking simulation at the box 350 recursively matches a grasp (from a database of grasps provided in advance from box 360) with a pose of a particular workpiece in the bin, removes that workpiece from the simulated bin, and continues until no more pickable objects remain. The picking simulation, which includes collision detection between the gripper and the bin walls and other workpieces, is described in detail below.

Each of the bin picking simulations is performed to clear one part at a time, just as an actual physical bin picking would be performed, and a number of leftovers (unpickable parts) is determined. For each specified gripper design, many of the bin picking simulations (e.g., 1000 different bins) are performed, each one beginning with a different random pile of objects. Ultimately, a performance score, such as an average number of leftovers for all of the 1000 bin simulations, is assigned to each specified gripper design and provided as output from the box 330 on line 370.

At box 380, the score for the previous gripper design is stored along with the fingertip shape parameters, and the gripper parameter space is re-sampled. New values of the gripper fingertip shape parameters are provided to the box 310, a new specified gripper design is computed and provided on the line 320, and the bin picking simulation is repeated.

Figure 4:
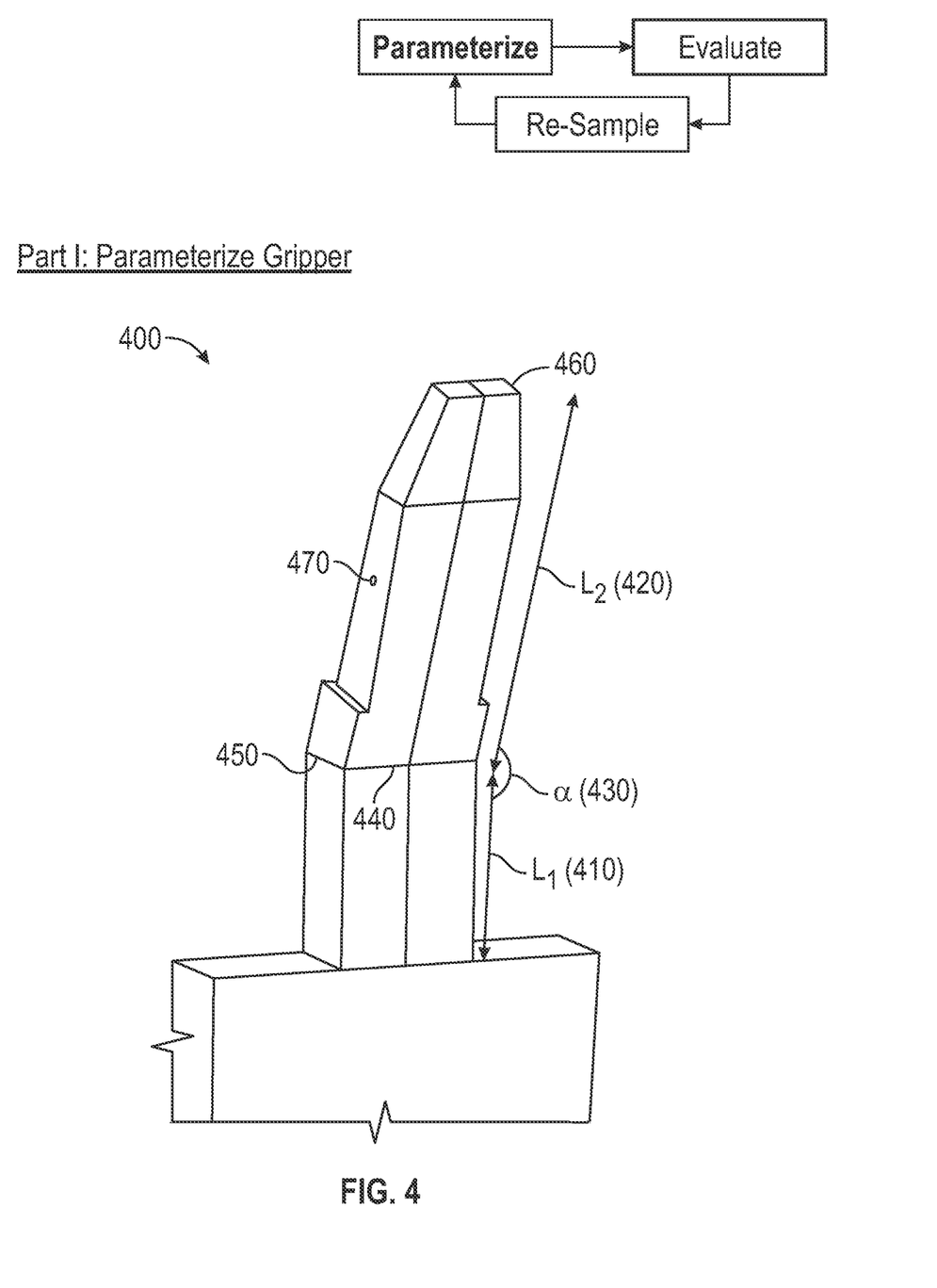
FIG. 4 is an illustration of fingertips of a parallel-finger robotic gripper, with fingertip size and shape parameters identified as used in the method of FIG. 3, according to an embodiment of the present disclosure.

FIG. 4 is an illustration of fingertips 400 of a parallel-finger robotic gripper, with fingertip size and shape parameters identified as used in the method of FIG. 3, according to an embodiment of the present disclosure. In a preferred embodiment, the parameters used in the gripper model include a length L1 (410) of a lower fingertip section, a length L2 (420) of an upper fingertip section and a bend angle α (430) between the lower fingertip section and the upper fingertip section. These three parameters have been found to allow the fingertip size and shape to be sufficiently varied in order to find an optimal fingertip design for a given workpiece.

Other size and shape values of the gripper fingertips are defined as fixed values in the gripper model and are not varied as parameters. These other size and shape values include, for example, a finger base width depicted by a line 440 in FIG. 4, a finger base thickness depicted by line 450 and a fingertip thickness depicted by a line 460. In addition, an outer face 470 of the gripper fingers may have a convex curvature along its length rather than being flat. Other fingertip shape properties, such as notches and bevels, may also be included as desired. Ultimately, given values of the parameters L1, L2 and α, the shapes of the gripper fingertips 400 of FIG. 4 along with the rest of the gripper are defined by the gripper model provided at the box 312 of FIG. 3.

It is to be understood that different fingertip shape parameters could be chosen than those shown in FIG. 4, and more or fewer than three parameters could be used, without departing from the spirit of the automated fingertip design technique of the present disclosure.

Figure 5:
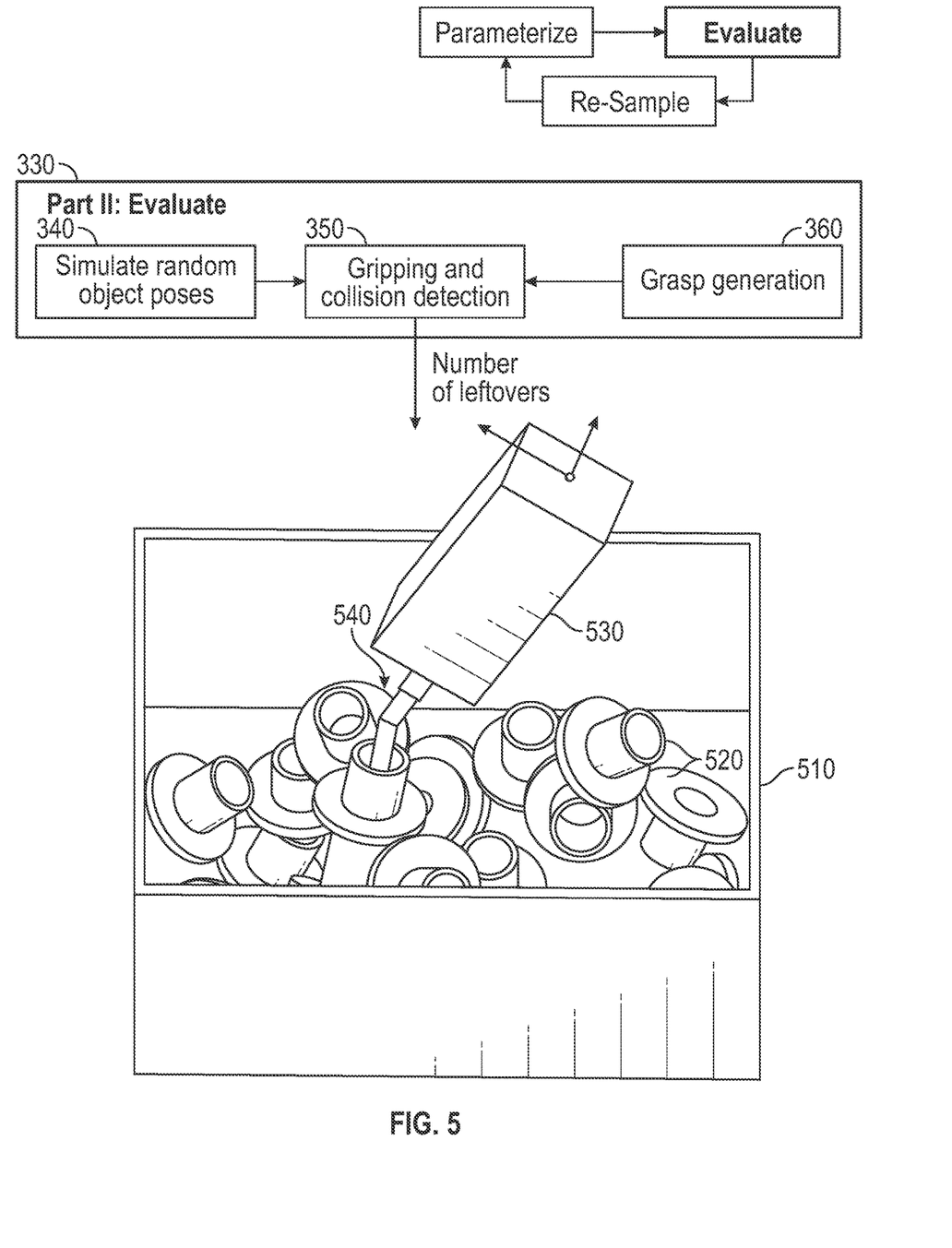
FIG. 5 is an illustration of a simulation of a gripper grasping a workpiece from a bin, depicting the concept of the bin picking evaluation portion of the method of FIG. 3, according to an embodiment of the present disclosure.

FIG. 5 is an illustration of a simulation of a gripper grasping a workpiece from a bin, depicting the concept of the bin picking evaluation portion of the method of FIG. 3, according to an embodiment of the present disclosure. As should be understood from the preceding discussion of FIG. 3, the gripping and collision detection simulation at the box 350 includes simulating a bin 510 with a plurality of workpieces 520 in a random pile or jumble. A specified design of a gripper 530 with fingertips 540 is used in a simulation to pick and remove one workpiece at a time until either no workpieces remain in the bin 510 or any remaining workpieces are not pickable due to collisions (such as the gripper body with a bin wall). A coordinate frame is shown on the gripper 530 to illustrate that the gripper 530 is placed in a particular position and orientation in order to cause the fingertips 540 to match the location of a suitable grasp on one of the workpieces 520. In the example shown in FIG. 5, the fingertips 540 are grasping an interior surface of one of the workpieces 520 (inside a cylindrical hole).

Figure 6:
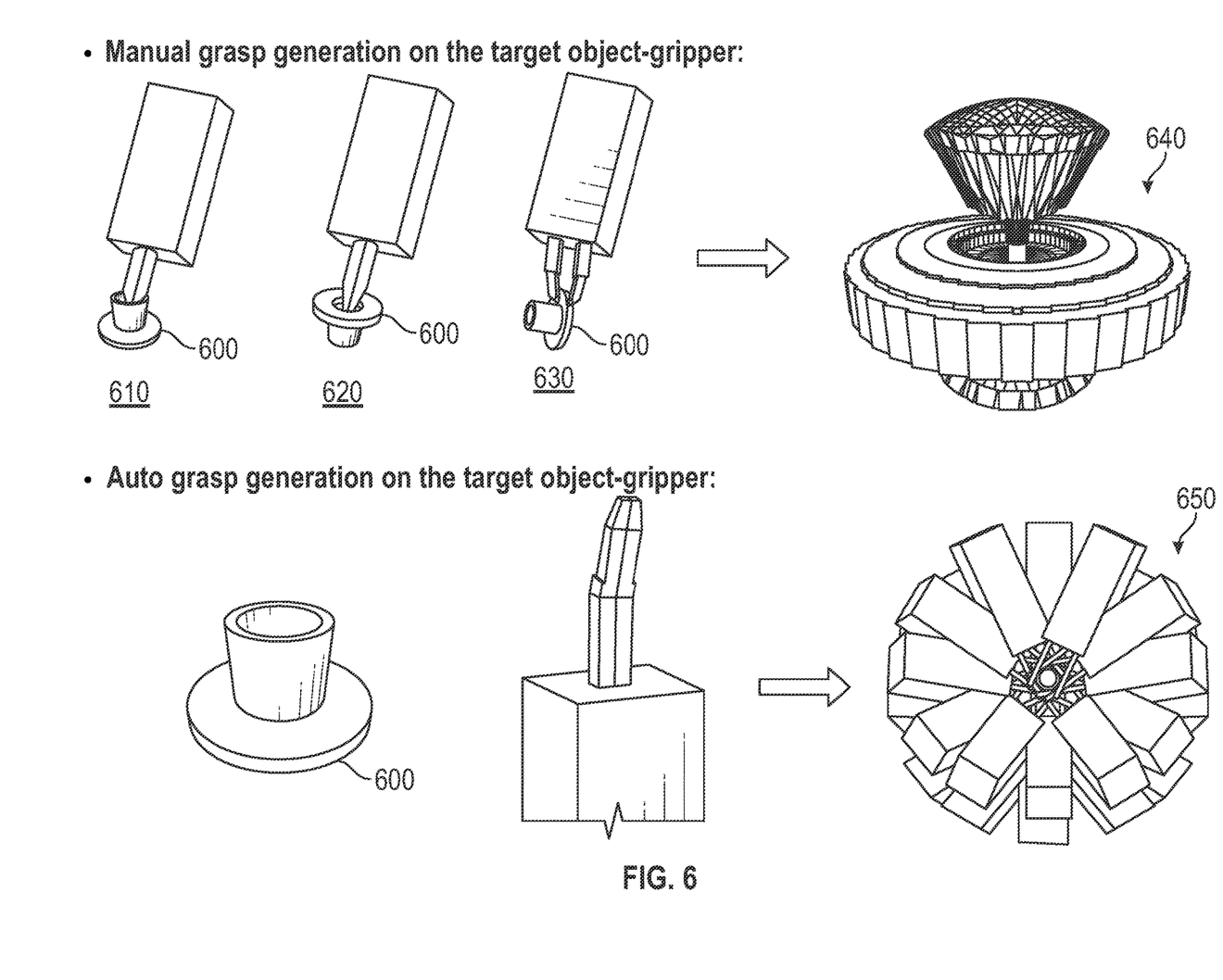
FIG. 6 is an illustration of both manual and automatic grasp generation techniques, where stable grasps of the workpiece by the gripper fingertips are identified, according to embodiments of the present disclosure.

FIG. 6 is an illustration of both manual and automatic grasp generation techniques, where stable grasps of the workpiece by the gripper fingertips are identified, according to embodiments of the present disclosure. The box 360 of FIG. 3 is where offline grasp generation on the workpiece is performed (in advance). This includes using the workpiece model provided at the box 342 and creating a database of stable grasps on the workpiece. A grasp is a target location and orientation for the gripper fingertips to be applied to the workpiece in order to grasp the workpiece in a stable manner. Both manual and automated grasp generation techniques are known in the art, and are illustrated conceptually in FIG. 6.

Manual grasp generation involves a user defining as many different grasps on the workpiece as possible. For example, at 610, the fingertips are gripping an interior surface of a workpiece 600 from a "top" of the workpiece 600. At 620, the fingertips are gripping an interior surface of the workpiece 600 from a "bottom" of the workpiece 600. At 630, the fingertips are gripping an exterior surface of the workpiece 600 on a flange. The grasps depicted at 610, 620 and 630 may be defined by controlling an actual robot to physically grasp an actual sample of the workpiece 600, or the grasps may be defined by a user on a computer having a 3D model of the workpiece 600. The three different grasps shown at 610/620/630 may then be rotationally replicated as shown at 640 to populate a grasp database as provided at the box 360.

Automatic grasp generation is performed by a specialized algorithm using a 3D model of the workpiece 600 along with a basic definition of gripper fingertip contact surfaces. Other control parameters may also be defined, such as preferred and/or prohibited grasp regions on the workpiece. Using these inputs, the automatic grasp generation algorithm computes many stable grasps on the workpiece as illustrated at 650. The grasps illustrated at 650, which may be only a subset of the total grasp database from automatic grasp generation, depict the gripper fingers grasping an exterior surface of a collar portion of the workpiece 600. Techniques are known in the art which may be used to perform the automatic grasp generation depicted in the lower portion of FIG. 6.

The automated fingertip design optimization technique of the present disclosure simply requires a database of grasps to be provided at the box 360, as shown in FIG. 3. The grasps may be generated using manual or automated technique as illustrated in FIG. 6, or any other suitable grasp generation methodology. In the grasp generation techniques, as depicted in FIG. 6 or otherwise, it is not necessary to know the complete shape of the gripper fingertips. It is only necessary to know the shape of contact patches on the fingers which may be applied to the workpiece to create the grasp.

Figure 7:
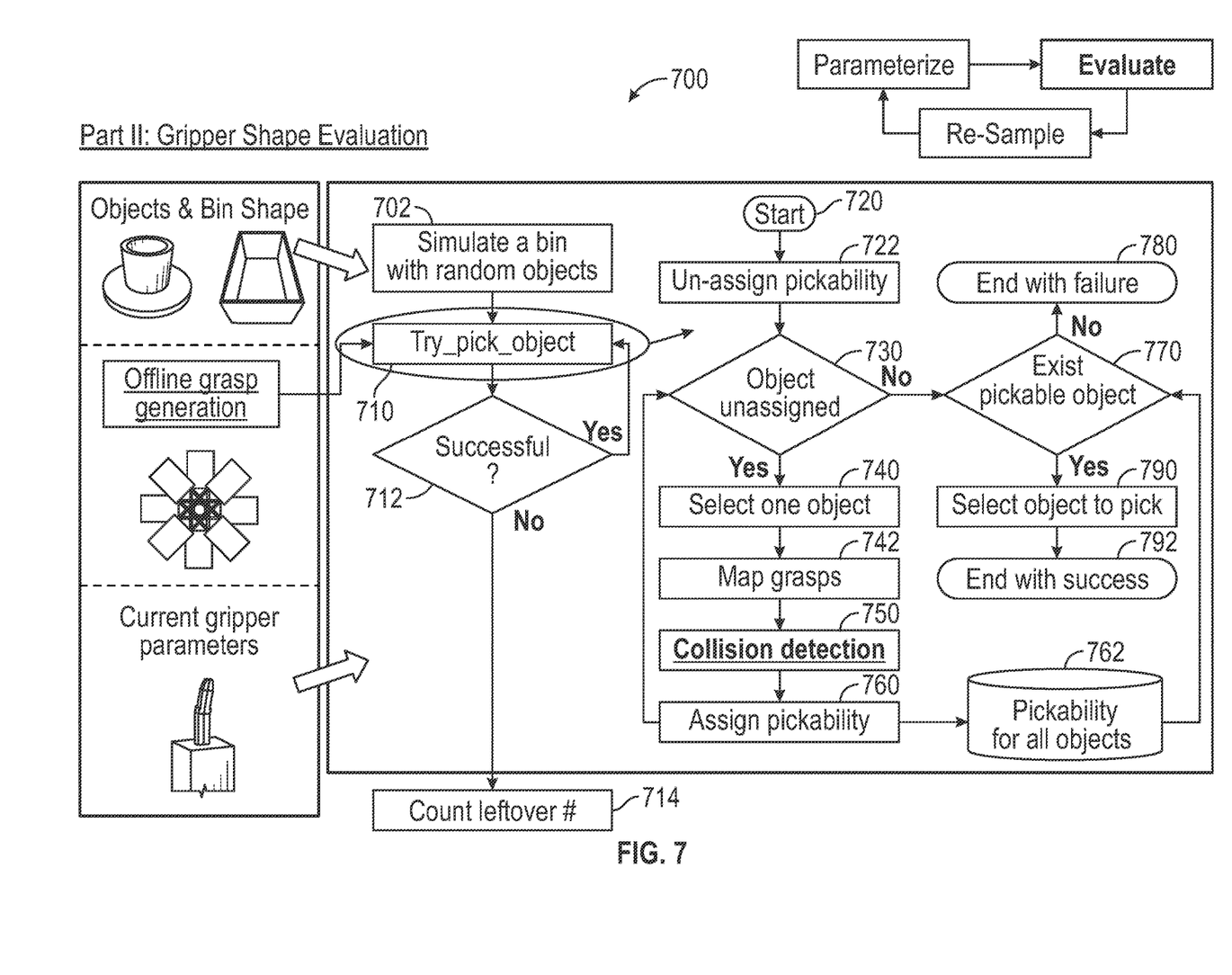
FIG. 7 is a flowchart diagram of a method for gripper shape evaluation, detailing steps used in simulating the picking of individual workpieces from a bin using a current gripper design, grasps as provided in FIG. 6, and collision detection, according to an embodiment of the present disclosure.

FIG. 7 is a flowchart diagram 700 of a method for gripper shape evaluation, detailing steps used in simulating the picking of individual workpieces from a bin using a current gripper design, workpiece grasps as provided in FIG. 6, and collision detection, according to an embodiment of the present disclosure. At the left side of FIG. 7, inputs to the gripper shape evaluation are provided, as discussed earlier. These inputs include object (workpiece) and bin models as provided at the box 342 of FIG. 3, a grasp database as provided at the box 360 of FIG. 3 and discussed further with respect to FIG. 6, and the current gripper fingertip parameters as provided at the box 310 of FIG. 3 and discussed further with respect to FIG. 4.

Beginning at box 702, simulation of a bin of objects in random positions is performed, as described earlier. At box 710, a simulated picking of one of the objects in the simulated bin is performed. The actions at the box 710 involve many steps, which are detailed on the right-hand side of FIG. 7 and will be discussed below. At decision diamond 712, it is determined whether the attempted object pick at the box 710 was successful. If so, the picked object is removed from the simulated bin of objects and the process returns to the box 710 to attempt to pick another object. If the attempted pick was not successful, then from the decision diamond 712 the process moves to box 714 where a number of leftovers in the bin is counted and stored. This corresponds to the number of leftovers provided on the line 370 of FIG. 3. After the box 714, the process begins again at the box 702 with a new simulated bin of objects, and this is repeated many times (e.g., 1000) for a particular set of gripper shape parameters.

Figure 8:
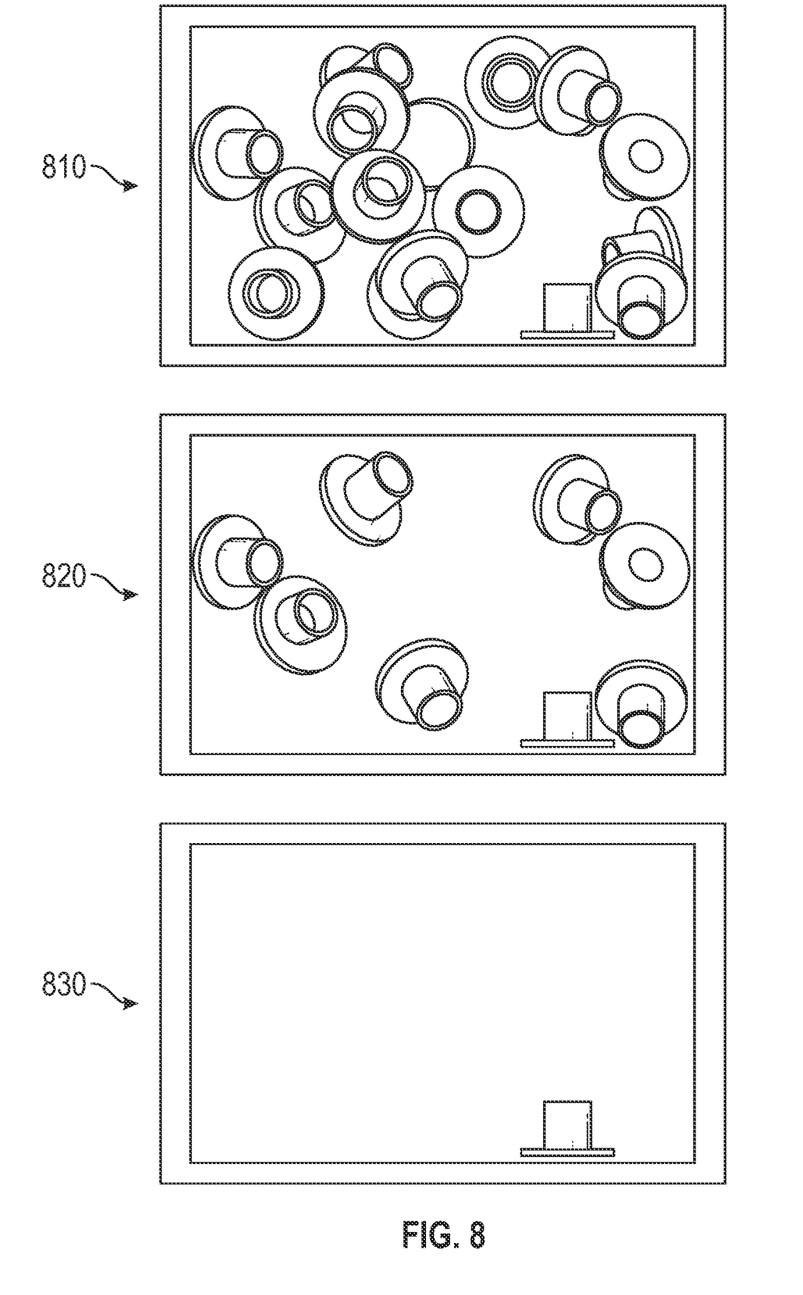
FIG. 8 is an illustration of workpieces in a bin at successive stages of the process of FIG. 7, including the initial random pile of workpieces in the bin, a subsequent stage where some of the workpieces have been removed in simulation, and a final stage where a single leftover unpickable workpiece remains, according to an embodiment of the present disclosure.

FIG. 8 is an illustration of workpieces in a bin at successive stages of the process of FIG. 7 (box 702 through box 714), including the initial random pile of workpieces in the bin shown at 810, a subsequent stage shown at 820 where some of the workpieces have been removed in simulation, and a final stage shown at 830 where a single leftover unpickable workpiece remains, according to an embodiment of the present disclosure. FIG. 8 is simply provided to illustrate the concept of simulating the emptying of a bin by performing a simulated pick of one object/workpiece at a time, evaluating grasps and collision detection, until no more pickable objects remain.

Returning to FIG. 7, the steps involved in attempting to pick an object, at the box 710 discussed above, will now be described in detail. The process which is performed in the box 710 begins at start oval 720. At box 722, pickability values for all objects in the bin are unassigned. This step simply clears the pickability values from the previous execution of the box 710. At decision diamond 730, it is determined if any objects in the bin have no pickability value assigned. If at least one object has no pickability value assigned, then at box 740 one object with no pickability value is selected. At box 742, grasps are mapped to the selected object (which has a particular position and orientation within the bin, and other neighboring objects potentially in contact).

At box 750, each grasp which has been mapped to the selected object is evaluated in a collision detection computation. The collision detection computation determines, for the particular grasp on the selected object, given its position/orientation and neighboring objects, whether the grasp can be accomplished without causing a collision of the gripper with any other object. This includes checking the gripper body for a collision with a bin wall or another object in the bin, and checking the gripper fingers for a collision with other objects in the bin.

The presently disclosed gripper finger shape optimization technique includes many thousands, or hundreds of thousands, of individual object grasping and collision detection computations—many gripper shape parameters are evaluated, each gripper evaluation includes many random bins of objects, and each bin may contain dozens of objects. Because of the large number of calculations involved, is imperative that the collision detection computation is fast and efficient as well as accurate. One collision detection technique known as GJK (Gilbert-Johnson-Keerthi) is not suitable for use in the presently disclosed method because GJK can only be used on convex objects. Convexification of the workpiece shapes for use in GJK is not a good solution because the convexification is likely to introduce errors in grasp surfaces, and also eliminate viable grasps such as internal grasps inside an opening in the object. Another collision detection technique, signed distance field (SDF), is also not suitable in the present method for accuracy reasons. In a preferred embodiment of the presently disclosed methods, a bounding volume hierarchy (BVH) technique for collision detection is used. The BVH collision detection technique, which uses triangle-triangle overlap calculations, has been found to provide fast and accurate results for collision checks between the gripper and both the bin walls and the other objects in the bin.

After the collision detection computation is performed for each mapped grasp on the selected object, a pickability value is assigned to the selected object at box 760. The pickability value may be a binary value (zero or "no" if unpickable, one or "yes" if pickable), or the pickability value may be assigned within a defined continuous range, such as zero to one. If a continuous range is used, zero would again designate an unpickable object (no collision-free grasps found), and the maximum pickability value would designate an object which presents a high quality grasp with no chance of gripper-object or gripper-bin collision.

From the box 760, the pickability value of the selected object is stored in a database 762, and the process loops back to the decision diamond 730 to determine if any other objects in the bin remain with no pickability value assigned. In subsequent passes through the steps 730-760, each selected object has its pickability value stored in the database 762. Other data besides the pickability value may be stored in the database 762, where the other data for each object may be used in later selecting which object to pick.

The mapping of grasps, collision detection and assignment of pickability is performed for each workpiece in the bin. For some workpieces, such as those that are buried beneath other workpieces in the pile, it may be possible to very quickly assign a pickability value of zero indicating that no collision-free grasps are available.

From the decision diamond 730, when it is determined that no objects in the bin remain with no pickability value assigned, the method proceeds to decision diamond 770, where it is determined whether any of the objects in the bin are pickable. This determination is made using the data in the database 762. If no pickable object exists, the method (encompassed in the box 710, "try to pick an object") ends with failure at box 780. In this case, at the decision diamond 712, the attempted object pick is unsuccessful, and the process moves to the box 714 and the number of leftovers in the bin is counted.

At the decision diamond 770, if at least one pickable object exists, the method proceeds to box 790 where one object is selected to pick, and the method (encompassed in the box 710, "try to pick an object") ends with success at box 792. In this case, at the decision diamond 712, the attempted object pick is successful, the selected object is removed from the simulated bin, and the process returns to the box 710 to attempt to pick another object. This nested process continues (outer loop=702-714; inner loop=720-792) until either the bin is empty or no pickable objects remain in the bin.

At the box 790, where an object is selected to pick, a rule may be defined for selection as deemed appropriate for a particular application. For example, the rule could be to always select the object which has the highest position in the pile of objects in the bin. Or the rule could be to select the object with the greatest collision avoidance clearance while performing the grasp. Many other rules, including weighted multi-factor rules, may be used as suitable. Depending on the nature of the selection rule or algorithm, other data besides the object pickability value may need to be stored in the database 762 to support the calculations (e.g., z coordinate of object centroid, grasp quality value, gripper clearance from bin and other objects during grasp, etc.). The process could also be modified slightly so that the first pickable object which is identified (or the first object having a pickability value exceeding a predefined threshold) is selected and picked, which would reduce the number of calculations involved in each bin picking simulation.

To summarize the method of FIG. 7, a simulated bin of objects is provided and a simulated picking of objects one at a time is performed until no pickable objects remain, at which point the number of leftovers is counted. For each set of gripper finger shape parameters, a large number (e.g., 1000) of bins with different random piles of objects is picked in successive simulations, and an overall score is assigned to the particular gripper shape based on the numbers of leftovers. Then new gripper finger shape parameters are selected and the process is repeated—such as about 100 times (100 different gripper fingertip shapes). In the end, each gripper fingertip shape which is evaluated has a performance score, based on the number of leftovers for each of the 1000 simulated bins.

Figure 9:
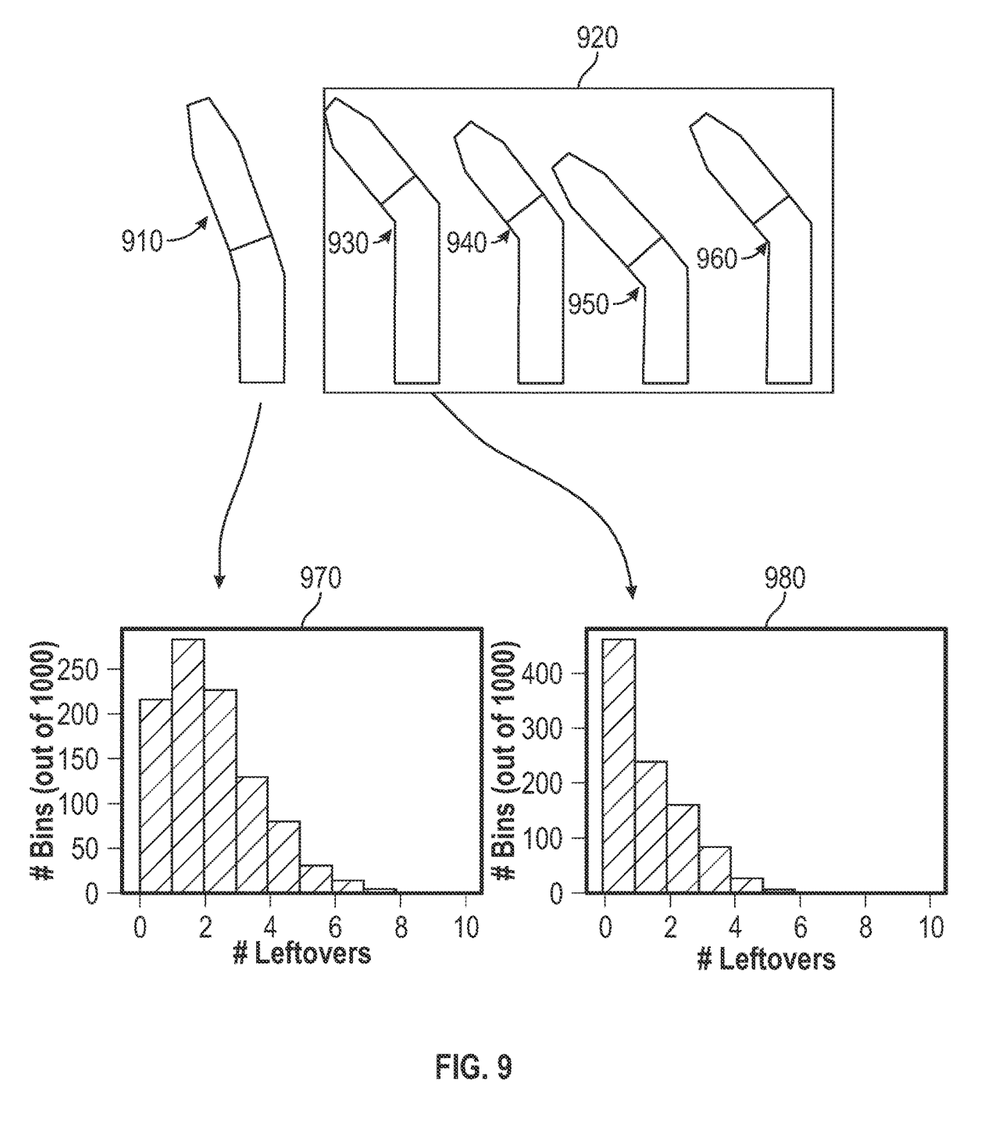
FIG. 9 is an illustration of several gripper fingertip designs evaluated by the disclosed techniques, along with charts showing distributions of leftover workpieces for two of the gripper designs, according to an embodiment of the present disclosure.

FIG. 9 is an illustration of several gripper fingertip designs evaluated by the disclosed techniques, along with charts showing distributions of leftover workpieces for two of the gripper designs, according to an embodiment of the present disclosure. Shown at 910 is a side view illustration of a gripper finger which had been used in actual robotic bin picking operations. The gripper finger design shown at 910 was believed by subject matter experts to be a suitable shape for bin picking of a particular workpiece design. In box 920 are several different gripper finger designs which were evaluated for bin picking performance on the particular workpiece design using the presently disclosed optimization technique. Each of the gripper finger designs (910, 930, 940, 950, 960) has the same basic shape properties (finger width and thickness, tip taper shape, etc.), but each design has different values of the fingertip shape parameters L1, L2 and α (described with respect to FIG. 4).

Shown at 970 is a bar chart displaying the number of bins which contained different quantities of leftover objects, for the original gripper finger design shown at 910. Out of 1000 simulated bins, about 215 bins had zero leftovers, about 290 bins has one leftover, about 225 bins had two leftovers, and smaller numbers of bins had three or more leftovers. The results shown in the bar chart at 970 were from simulations where the grasps were manually defined, and therefore the number of grasps in the grasp database was limited.

Shown at 980 is a bar chart displaying the number of bins which contained different quantities of leftover objects, for the gripper finger design shown at 930, which was the best-performing gripper finger design from the presently disclosed fingertip optimization method. For the optimized fingertip shape, out of 1000 simulated bins, about 480 bins had zero leftovers, about 230 bins has one leftover, and smaller numbers of bins had two or more leftovers. Again, the results shown in the bar chart at 980 were from simulations where the grasps were manually defined, and the number of grasps in the grasp database was limited. When both manual and automated grasp generation techniques were used and the number of grasps in the grasp database was larger, the gripper fingertip shape optimization method was able to totally clear all of the bins—i.e., all of the 1000 bins had zero leftovers.

It is readily apparent from the bar charts 970 and 980 that the fingertip shape resulting from the disclosed optimization method provides superior bin picking performance, by any metric, on the particular workpiece design that was provided as input. That is, the optimized fingertip design produces far more bins with zero leftovers than the original fingertip design, and the optimized design produces far fewer total leftovers (from the 1000 simulated bins) than the original fingertip design. Additionally, when a large number of grasps are provided in the grasp database, the disclosed fingertip shape optimization method demonstrated the ability to clear all bins with no leftovers. The disclosed method provides the ability to quickly and easily compute an optimized gripper fingertip shape for bin picking of any workpiece design, resulting in reduced numbers of leftover parts compared to a user-selected gripper fingertip shape.

Figure 10:
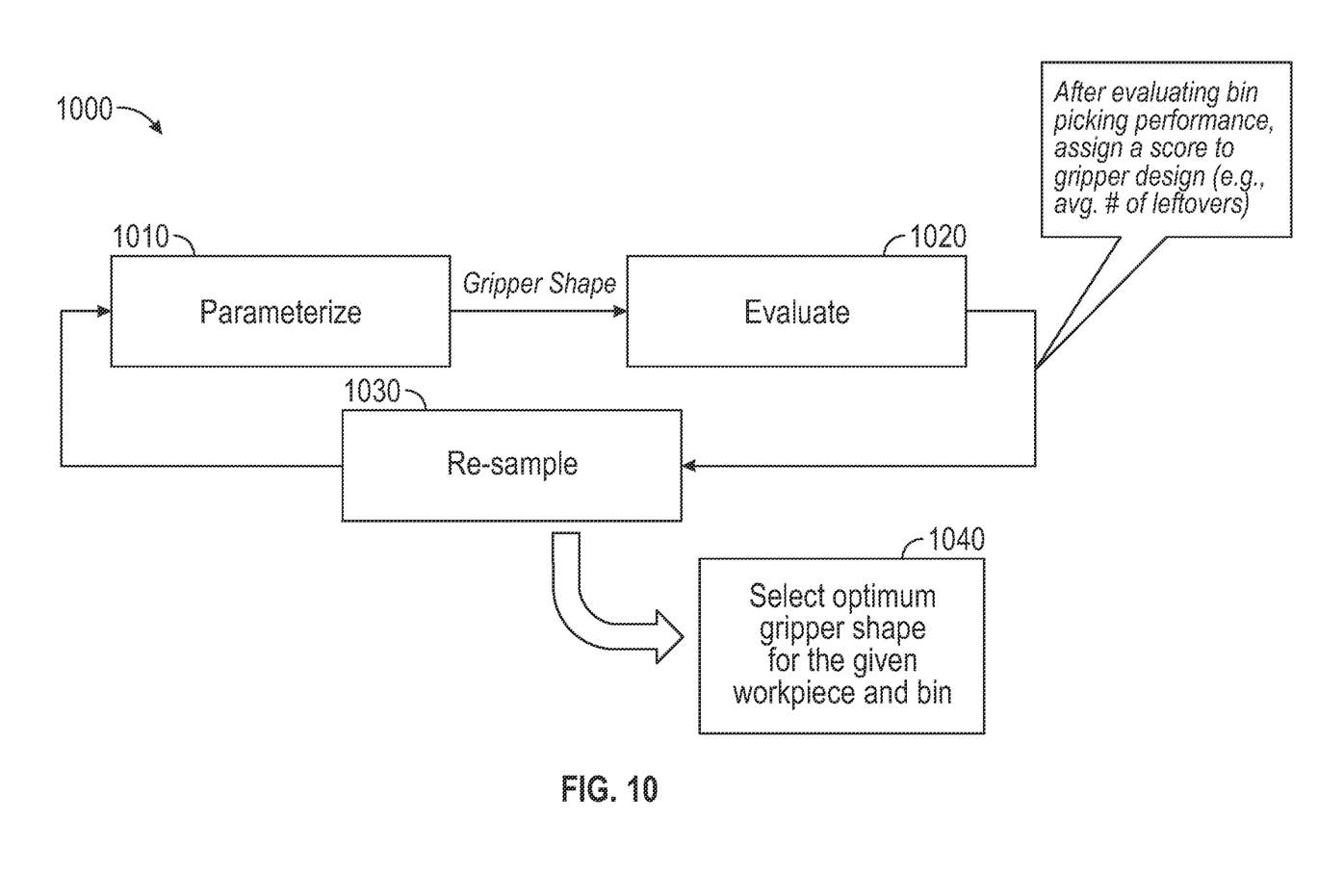
FIG. 10 is an annotated flowchart diagram depicting the steps involved in automatic gripper fingertip design, according to an embodiment of the present disclosure.

FIG. 10 is an annotated flowchart diagram 1000 depicting the steps involved in automatic gripper fingertip design, according to an embodiment of the present disclosure. FIG. 10 is provided merely to recap and summarize the technique described above with respect to FIG. 3 and other figures. A gripper shape is defined (box 1010) in terms of its basic unchangeable dimensions and a small number of skeletal parameters such as first and second fingertip segment lengths and an intervening bend angle. A workpiece (object) design and a bin shape are provided, values of the fingertip parameters are defined, and the defined gripper fingertip shape is evaluated (box 1020) by performing a simulated picking of a large number (e.g., 1000) of randomly defined bins of objects. After evaluating bin picking performance, a score is assigned to the gripper design which was just evaluated, where the score reflects a number of leftover objects from the bin picking simulations (lower is better). The gripper fingertip parameter space is then re-sampled (box 1030) and the evaluation process is repeated for the new gripper fingertip shape parameters. The entire loop is repeated for a user-specified number of gripper fingertip designs (e.g., 100), and the optimum gripper shape is chosen (box 1040) for the given workpiece design and bin shape (lowest number of leftovers).

Many different features of the fingertip shape optimization techniques disclosed above may be varied to suit user preference or a particular application. For example, as discussed earlier, automatic or manual grasp generation techniques may be used, or even a combination of both. Bin picking performance will be better when more unique grasps are provided, as a larger number of available grasps provides more opportunities to find a collision-free grasp. It has been observed in tests of the presently disclosed method that with automatic grasp generation and a larger grasp database, more bins can be cleared and the average number of leftovers is reduced.

It is also possible to run the disclosed method for fingertip shape optimization recursively as follows. First, the optimization method is executed using broad ranges of the fingertip shape parameters, with fairly coarse value increments within the parameter ranges. This would yield a few general shapes which have the best bin picking performance for the prescribed workpiece design. Then the optimization method can be executed again using fine increments of parameter values within a narrow range of one or more of the best-performing shapes from the first optimization. For example, in the box 920 of FIG. 9, the fingertip designs indicated at 930 and 950 both performed well in the bin picking simulations, but they have substantially different shapes (different values of L1, L2 and α). A second round of fingertip shape optimization computations could be executed, including the parameters being within a narrow range of the 930 design in one computation, and the parameters being within a narrow range of the 950 design in a second computation. This recursive execution of the optimization computation would yield a gripper fingertip shape with even better bin picking performance than the first optimization computation alone.

The fingertip optimization computation of the present disclosure has been demonstrated to be very computationally efficient and therefore feasible for real-world applications. For a particular workpiece shape and set of fingertip parameters, the complete fingertip optimization computation (dozens of parts per bin, 1000 bins, 100 fingertip parameter samples) runs in about two hours of CPU time on a current-generation processor. This efficiency is due in part to the selection of an efficient collision checking routine, as discussed above.

A simplified version of the technique described above may also be employed, where only a single object is randomly placed in each bin (rather than, say, 20 or 30), and picking of the one object is attempted. In this case, the number of leftovers will either be zero or one, where the one object will be unpickable if it happens to have a position and orientation in the bin where no collision-free grasps present themselves. This simplified method still tends to pick the most effective gripper fingertip shape, as the segment lengths and bend angle will affect the availability of collision-free grasps based on the workpiece shape. The effectiveness of the simplified method was demonstrated by running the simplified method in a "training" phase to identify an optimal gripper fingertip shape, then running the complete bin picking simulation (20-30 objects per bin) for the identified fingertip shape in a "testing" phase to provide results as shown on FIG. 9 (a bar chart with numbers of leftovers). In this demonstration, the simplified method identified a gripper fingertip shape which was almost as effective as a fingertip shape identified by the complete optimization method. The simplified optimization computation described above runs in about 10 minutes of CPU time, as compared to the two hours of CPU time for the complete fingertip optimization computation.

In addition to the execution options discussed above, it is also possible of course to vary the number of bins to simulate (more or fewer than 1000) for each set of fingertip parameters, and to vary the number of fingertip parameter re-samplings to perform (more or fewer than 100). These many flexible features and options allow the disclosed fingertip optimization method to be applied as most advantageous for a particular real-world robotic bin picking application. For example, the simplified method (one part per bin) may be used for quickly computing fingertip shape for small volume production runs. On the other hand, the complete method (dozens of parts per bin, 1000 bins, 100 fingertip parameter samples) may be executed recursively to identify a highly optimized fingertip shape for large volume production runs where even a small improvement in bin picking performance is beneficial.

After running the robot gripper fingertip design technique, the optimized finger design can be produced using 3D printing or other techniques, and the fingers used on a robot gripper for actual bin picking operations.

The automatic robot gripper fingertip design technique discussed above offers several advantages over existing methods. The disclosed methods are easily and automatically executed based on minimal input information including a parameterized gripper model and a workpiece design, along with a grasp database for the workpiece. The disclosed methods provide a gripper fingertip shape which delivers better bin picking performance than human-selected gripper fingers, and the methods include many flexible features and options which allow the methods to be applied in a manner which is most suitable for a particular bin picking application.

Throughout the preceding discussion, various computers and controllers are described and implied. It is to be understood that the software applications and modules of these computers and controllers are executed on one or more computing devices having a processor and a memory module. In particular, this includes a computing device with algorithms configured to perform the gripper fingertip design optimization methods of FIGS. 3, 7 and 10—with interfaces as necessary for input/output, including a user interface (keyboard, mouse, display device) and interfaces to other systems such as CAD systems (for gripper and workpiece models) and a 3D printing system (for producing gripper fingers having the optimized shape).

While a number of exemplary aspects and embodiments of the technique for automatic robot gripper fingertip design have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for robot gripper fingertip design, said method comprising:
   providing a gripper model including parameters defining size or shape features of gripper fingertips;
   providing an object model for an object to be grasped, a grasp database defining stable grasps on the object, and size dimensions of a bin;
   selecting values of the parameters to define a specified fingertip design;
   evaluating a bin picking performance of the specified fingertip design, on a computer having a processor and memory, including repeatedly simulating part-by-part bin picking for a quantity of simulated bins, where each part-by-part bin picking includes defining a quantity of the object in random poses in the bin, repeatedly simulating picking a next object in the bin with a gripper having the specified fingertip design using the grasps in the grasp database and a collision detection algorithm, and determining a number of leftover objects when no pickable objects remain in the bin, where the bin picking performance is based on the number of the leftover objects for all of the simulated bins;
   recursively selecting new values of the parameters to define a new specified fingertip design and evaluating the bin picking performance of the new specified fingertip design; and
   selecting an optimized fingertip design as the one of the specified fingertip designs having a best bin picking performance.

2. The method according to claim 1 further comprising fabricating gripper fingers using the optimized fingertip design, and using the gripper fingers in a gripper on a robot performing actual bin picking of the object.

3. The method according to claim 1 wherein simulating picking an object includes selecting one object in the bin, mapping grasps from the grasp database to the one object, performing a collision detection computation for each of the mapped grasps, and assigning a pickability value to the one object based on the mapped grasps and the collision detection computation.

4. The method according to claim 3 further comprising repeatedly selecting another one object in the bin until all of the objects in the bin have a pickability value assigned.

5. The method according to claim 4 wherein, when all of the objects in the bin have a pickability value assigned, an object to pick is selected based on a user-defined rule.

6. The method according to claim 5 wherein the rule is to select the object to pick based on a greatest pickability value or a greatest clearance to other objects during grasping.

7. The method according to claim 5 wherein the rule is to select the object to pick based on a suitable pickability value and a greatest object height in the bin.

8. The method according to claim 1 wherein the quantity the objects in random poses in the bin is one.

9. The method according to claim 1 wherein the quantity the objects in random poses in the bin is greater than 10.

10. The method according to claim 1 wherein selecting an optimized fingertip design includes selecting the one of the specified fingertip designs having the fewest total leftover objects for all of the simulated bins, or selecting the one of the specified fingertip designs having the largest number of the simulated bins with zero leftover objects.

11. The method according to claim 1 wherein the parameters defining size or shape features of gripper fingertips include a length of a first segment of the gripper fingertips, a length of a second segment of the gripper fingertips, and a bend angle included between the first segment and the second segment.

12. The method according to claim 1 wherein repeatedly simulating part-by-part bin picking for a quantity of simulated bins includes a quantity of 500 or more simulated bins, and recursively selecting new values of the parameters to define a new specified fingertip design includes selecting new values of the parameters at least 50 times.

13. A method for robot gripper fingertip design, said method comprising:
   providing a gripper model including parameters defining size or shape features of gripper fingertips;
   providing an object model for an object to be grasped, a grasp database defining stable grasps on the object, and size dimensions of a bin; and
   performing an optimization computation on the gripper fingertip design, on a computing device, including varying the parameters defining the gripper fingertips and for each set of parameter values performing multiple bin picking simulations until no collision-free object grasps remain, and determining an optimal fingertip design using the set of parameter values which resulted in a lowest number of leftovers from the multiple bin picking simulations, where each of the bin picking simulations comprises simulating part-by-part bin picking including defining a quantity of the object in random poses in the bin, repeatedly simulating picking an object with a gripper having the gripper fingertip design specified by the parameter values using the grasps in the grasp database and a collision detection algorithm, and determining a number of leftover objects when no pickable objects remain in the bin.

14. The method according to claim 13 wherein performing an optimization computation on the gripper fingertip design includes:
selecting values of the parameters to define a specified fingertip design;
evaluating a bin picking performance of the specified fingertip design, including repeatedly simulating part-by-part bin picking for a quantity of simulated bins, where the bin picking performance is based on the number of the leftover objects for all of the simulated bins; and
recursively selecting new values of the parameters to define a new specified fingertip design and evaluating the bin picking performance of the new specified fingertip design.

15. A non-transitory computer readable media storing thereon a computer program product, executing by a processor of a computing device, configured to perform steps comprising:
providing a gripper model including parameters defining size or shape features of gripper fingertips;
providing an object model for an object to be grasped, a grasp database defining stable grasps on the object, and size dimensions of a bin;
selecting values of the parameters to define a specified fingertip design;
evaluating a bin picking performance of the specified fingertip design, including repeatedly simulating part-by-part bin picking for a quantity of simulated bins, where each part-by-part bin picking includes defining a quantity of the object in random poses in the bin, repeatedly simulating picking a next object in the bin with a gripper having the specified fingertip design using the grasps in the grasp database and a collision detection algorithm, and determining a number of leftover objects when no pickable objects remain in the bin, where the bin picking performance is based on the number of the leftover objects for all of the simulated bins;
recursively selecting new values of the parameters to define a new specified fingertip design and evaluating the bin picking performance of the new specified fingertip design; and
selecting an optimized fingertip design as the one of the specified fingertip designs having a best bin picking performance.

16. The non-transitory computer readable media according to claim 15 wherein simulating picking an object includes selecting one object in the bin, mapping grasps from the grasp database to the one object, performing a collision detection computation for each of the mapped grasps, and assigning a pickability value to the one object based on the mapped grasps and the collision detection computation, and repeatedly selecting another one object in the bin until all of the objects in the bin have a pickability value assigned.

17. The non-transitory computer readable media according to claim 16 wherein, when all of the objects in the bin have a pickability value assigned, an object to pick is selected based on a user-defined rule, and the rule is to select the object to pick based on a greatest pickability value, or a greatest clearance to other objects during grasping, or a greatest object height in the bin.

18. The non-transitory computer readable media according to claim 15 wherein selecting an optimized fingertip design includes selecting the one of the specified fingertip designs having the fewest total leftover objects for all of the simulated bins, or selecting the one of the specified fingertip designs having the largest number of the simulated bins with zero leftover objects.

19. The non-transitory computer readable media according to claim 15 wherein the parameters defining size or shape features of gripper fingertips include a length of a first segment of the gripper fingertips, a length of a second segment of the gripper fingertips, and a bend angle included between the first segment and the second segment.

20. The non-transitory computer readable media according to claim 15 wherein repeatedly simulating part-by-part bin picking for a quantity of simulated bins includes a quantity of 500 or more simulated bins, and recursively selecting new values of the parameters to define a new specified fingertip design includes selecting new values of the parameters at least 50 times.

* * * * *